United States Patent
Breuker et al.

(10) Patent No.: US 6,308,166 B1
(45) Date of Patent: Oct. 23, 2001

(54) METHODOLOGY FOR ADVANCED QUANTITY-ORIENTED COST ASSIGNMENT USING VARIOUS INFORMATION SOURCES

(75) Inventors: Jens-Stefan Breuker, Walldorf; Evelyn Rullof, Woellstein; Harald Stuckert, Mauer; Peter von Zimmermann, Angelbachtal, all of (DE)

(73) Assignee: SAP Aktiengesellschaft (DE)

( * ) Notice: Subject to any disclaimer, the term of this patent is extended or adjusted under 35 U.S.C. 154(b) by 0 days.

(21) Appl. No.: 09/137,037

(22) Filed: Aug. 20, 1998

(51) Int. Cl.$^7$ .................................................. G06F 17/00
(52) U.S. Cl. .............................................. 705/400; 704/8
(58) Field of Search ................... 705/400, 7, 8; 706/925; 703/1; 704/8

(56) References Cited

U.S. PATENT DOCUMENTS

| | | | |
|---|---|---|---|
| 4,688,195 | * | 8/1987 | Thompson et al. ............... 706/11 |
| 5,546,564 | * | 8/1996 | Horie ........................... 703/1 |
| 5,596,752 | * | 1/1997 | Knudsen et al. ................. 717/1 |

FOREIGN PATENT DOCUMENTS

| | | |
|---|---|---|
| 2 262 369 A | 6/1993 | (GB). |
| WO 98 11493 A | 3/1998 | (WO). |
| WO 98 33134 A | 7/1998 | (WO). |

OTHER PUBLICATIONS

Johnson, Thomas; It's Time to Stop Overselling Activity–Based Concepts; Sep. 1992; Management Accounting v74n3, pp 26–35, DialogWeb copy pp. 1–17.*

"Operative Linkage of CO–ABC with Product Costing" Sep. 1996, p. 1–16.

Berliner, Callie and Brimson, James A. eds., Cost Management for Today's Advanced Manufacturing. The CAM–I Conceptual Design, 1988, pp. 6–13, Harvard Business School Press, Boston, MA, USA.

Turney, Peter B.B., The ABC Performance Breakthrough. How to suceed with activity–based costing, 1991, pp. 126–135, 168–171, Cost Technology, Hillsboro, OR USA.

Brimson, James A. and Antos, John, Activity–Based Management For Service Industries, Government Entitites, And Nonprofit Organizations, 1994, pp. 208–213, John Wiley & Sons, Inc., New York, NY, USA.

* cited by examiner

Primary Examiner—James P. Trammell
Assistant Examiner—Thomas A. Dixon
(74) Attorney, Agent, or Firm—Chadbourne & Parke (57) ABSTRACT

A process template is provided to enhance the evaluation and control of an organization's costs, utilizing three layers. The first layer provides a user interface that accepts language-dependent function names and descriptions utilizing different editors for cells within the template. The second layer utilizes a parser to check the syntax of the functions and create control blocks that are internal representations of the functions. The third layer handles the physical storage of the template and generates an executable report.

A flexible link to different cost objects is created so that an evaluation within different costing applications may occur. As the sender objects and the quantities are determined during the evaluation, a sophisticated, demand-driven cost assignment from a receiver point of view occurs.

28 Claims, 7 Drawing Sheets

METHODOLOGY FOR ADVANCED QUANTITY-ORIENTED COST ASSIGNMENT USING VARIOUS INFORMATION SOURCES

BACKGROUND OF THE INVENTION

Organizations are finding it increasingly difficult to compete in the international marketplace as markets become more global. The increasing competition in many areas of manufacturing, commerce, services, and other forms of business leads to sinking market prices, which in turn causes profit margins to decrease. Meanwhile, rapidly changing technologies lead to greater automation, which increases efficiency but also requires the allocation of funds for the expenses associated with new equipment. When deciding whether to invest in expensive equipment, organizations are forced to weigh the associated long-term costs and benefits.

At the same time, there is also great pressure for organizations to make profits in the short term. Investors are increasingly focusing on short-term results, and product life cycles are generally becoming shorter. Expenditures that create increased overhead need to be understood to justify the impact in the short term.

Thus, organizations have a growing interest in clearly understanding their overhead structure. Cost accounting approaches, such as activity based costing, are often used for monitoring overhead. Detailed analysis and overviews are available for the direct costs of production, such as wages, materials, machine hours, etc. However, indirect costs of manufacturing, sales, and administration are traditionally more difficult to measure, and cost controlling is even more difficult to implement.

In traditional cost accounting, an important tool is the structuring of costs based on organizational and responsibility considerations. This allows identification of where costs occur within an organization. Product cost planning has also traditionally focused almost exclusively on direct production costs. More sophisticated accounting techniques, such as activity based costing, may assist in explaining why those costs came to be what they are, or how they can be changed beneficially. They may also be used to assign indirect costs to the end products, which becomes more important when overhead costs are high. Organizations that are careless with the computation of such costs are in greater danger of costing themselves out of the market. Today, it is even more important that management base its decisions on accurate and current costing information, so that the best strategies for investments, products, sales, distribution, and services may be implemented.

However, these more sophisticated accounting techniques are difficult to implement using the tools available today. Presently, cost allocation is often only value-based, because a simple way to find the appropriate cost drivers has heretofore been unknown. In other implementations, assignments could only use quantities based on inadequate information, such as the amount of direct labor from the routing. In both cases, the results are not sufficient. Simple, fast, and accurate determination of quantity flows is a major challenge facing an adequate cost assignment. Therefore, it would be advantageous to have an effective method, that is quantity or resource oriented, for tracking costs to which accounting techniques are applied.

SUMMARY OF THE INVENTION

The present invention relates to a method for establishing a quantity-based and origin-appropriate allocation of costs between resource-providing (sender) and resource-consuming (receiver) objects using various sources of information. Quantity-based cost allocation (the identification of responsible cost drivers) is an important aspect of cost accounting. A precise quantity framework is utilized to support advanced costing techniques, such as activity-based costing.

The invention is a novel method of enhancing the evaluation and control of costs confronted by an organization. A flexible link to different cost (receiving) objects is created so that an evaluation within different costing applications may occur. As the sender objects and the quantities are determined during the evaluation, the invention allows a sophisticated, demand-driven cost assignment from a receiver point of view (also referred to as "backflush") to occur.

A process template is provided to accept language-dependent function names and descriptions, parse the functions to create control blocks that represent the functions, and to generate an executable report based upon the control blocks.

An object of the invention is to provide a novel method of tracking costs associated with an organization.

Another object of the invention is to monitor costs based on the organization of business processes which cross functional boundaries.

Another object of the invention is to improve cost transparency in overhead areas with quantity-based and value-based documentation of business process consumption.

Another object of the invention is to accept language-dependent functions within an improved template.

Another object of the invention is to provide a plurality of separate and distinct editor modules for cells within an improved template.

Another object of the invention is to provide a parser that is capable of parsing language-dependent functions within an improved template.

Another object of the invention is to translate external, language-specific functions and parameters into an internal description for use with an improved template.

Another object of the invention is to create control blocks within an improved template, wherein the control blocks are derived from language-dependent functions.

Another object of the invention is to create control blocks within an improved template, wherein the control blocks are internal representations of functions within the template.

Another object of the invention is to provide a standardized definition of interfaces that allows easy communication between a maintenance core module and a plurality of editors for use with an improved template.

Another object of the invention is to generate an executable report of an improved template based upon control blocks derived from language-dependent functions.

DETAILED DESCRIPTION OF THE INVENTION

The present invention relates to a tool or method for establishing a quantity-based allocation of costs between resource-providing objects (also referred to as "sender" objects) and resource-consuming objects (also referred to as "receiver" objects) using various sources of information. With quantity-based cost allocation, the identification of the responsible cost drivers is an important first step to accomplish effective cost accounting.

The present invention was developed as a portion of the Controlling component of the SAP R/3 System in the context of operational Activity-Based Costing, and as a supplement to Cost Center Accounting in the SAP R/3 System.

The present invention is primarily contemplated for use in conjunction with operational activity based costing applications. It will be appreciated that the invention may be practiced using different hardware and operating system platforms. The invention as described operates as a module of a larger system.

The following description is of the best presently contemplated mode of carrying out the present invention. This description is not to be taken in a limiting sense but is made merely for the purpose of describing the general principles of the invention.

Overview of the Process Template

Figure 1:
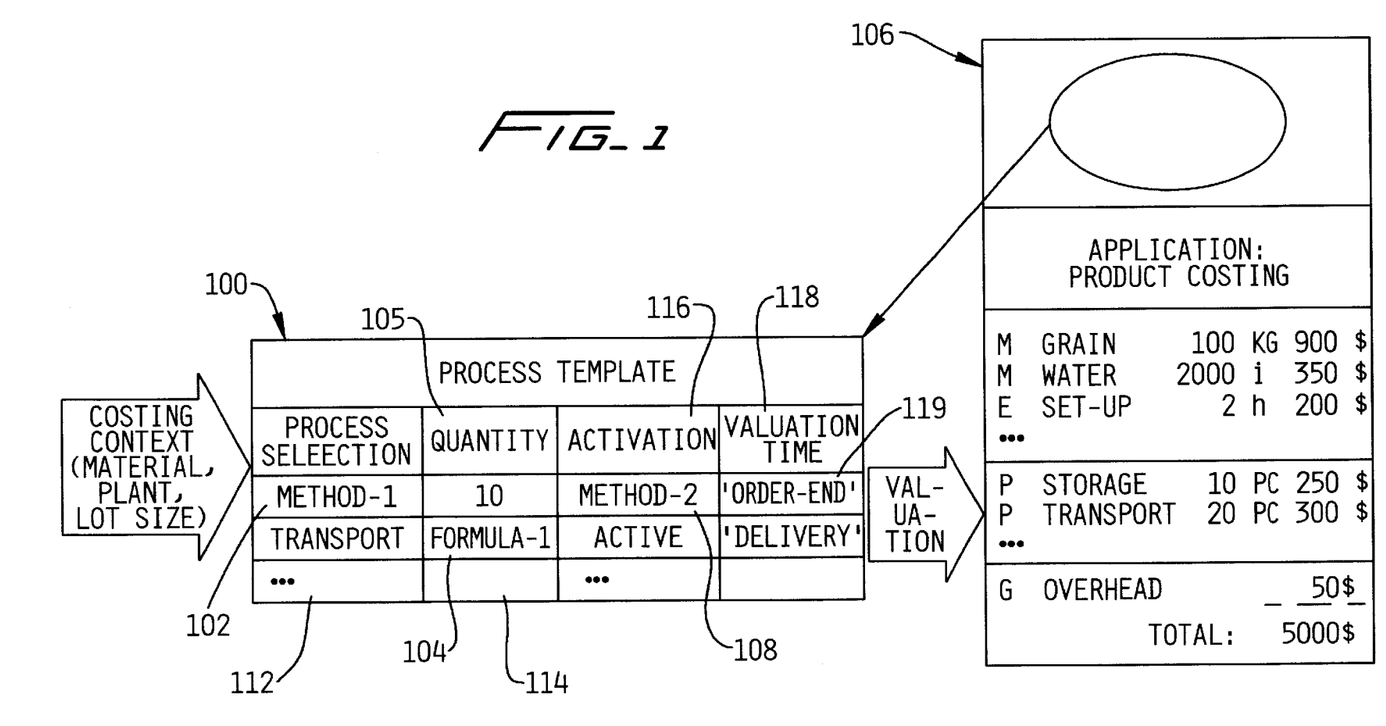
FIG. 1 shows an overview of an example of a process template.

With reference to FIG. 1, process template overview 100 represents a process template consisting of a matrix-like construct having, in the example shown, four columns and several rows of cells. Some cells contain methods, such as cell 102, and some cells contain formulas, such as cell 104. Both methods and formulas constitute functions. Generally, functions are used to determine the sender objects, i.e., to identify where money and/or resources come from. Functions are also used to calculate the quantity flow (i.e., to determine the money and/or resource relationship) between the sender objects and receiver objects to which the template is linked.

The valuation of a template is triggered by a costing application, which may be a product costing application, such as product costing application 106. Another example of a costing application is actual cost evaluation. Costing applications are utilized in the framework for any cost allocation.

The valuation of a process template, or of its individual functions, is a separate concept from the definition of a process template. The definition of a process template involves defining the relationships among sender objects and receiver objects. These relationships may be defined through the use of functions. The valuation of a process template involves the application of the functions within the process template to dynamically utilize the latest available data.

A preferred embodiment of the process template has four columns. The process template represented by process template overview 100 has selection column 112 and activation column 116, which are "Boolean type" columns. This process template also has quantity column 114 and valuation time column 118, which are "quantity type" columns.

Selection column 112 contains the name of functions to find appropriate processes. Selection functions, such as the selection method associated with cell 102, define which process(es) to use as sender object(s) and contain the conditions that need to be fulfilled by the processes.

Activation column 116 contains the name of functions (rules or values) to determine whether processes are to be allocated. Activation functions, such as the activation method associated with cell 108, define a non-process related Boolean condition to trigger the valuation of the current template row.

Quantity column 114 contains the name of functions, such as the quantity formula associated with cell 104, or fixed numerical values, such as the quantity numerical value associated with cell 105. Quantity formulas consist of mathematical expressions for determining the appropriate process quantity for each process selected for the current template row. Fixed quantity numerical values determine the appropriate process quantity for each process selected for the current template row directly without further computation.

Valuation time column 118 contains the name of functions that valuate a factor between 0 and 1 which can be used to adjust the results of the current row's quantity formula depending on the given state of the cost collecting object. For example, the valuation time function associated with cell 119 returns a "1" if the currently considered production order has the status "end-of-order", and returns "0" if the currently considered production order has any other status.

Functions can be divided into two classes. The first class of functions includes functions that are general and application-independent, and are used for tasks such as reading information in an existing database (for example, retrieving the bill of material). These functions are often predefined within the process template system, and are supported by other modules that may exist outside the process template system.

The second class of functions includes functions that handle information that is cost object specific and is generated by applications that valuate a process template in real time. These functions call routines from these applications, which provide needed data on demand.

In this preferred embodiment, selection column 112 and quantity column 114 must be defined for the process template. Activation column 116 and valuation time column 118 are obligatory where the defaults are "True" or "1".

Figure 2:
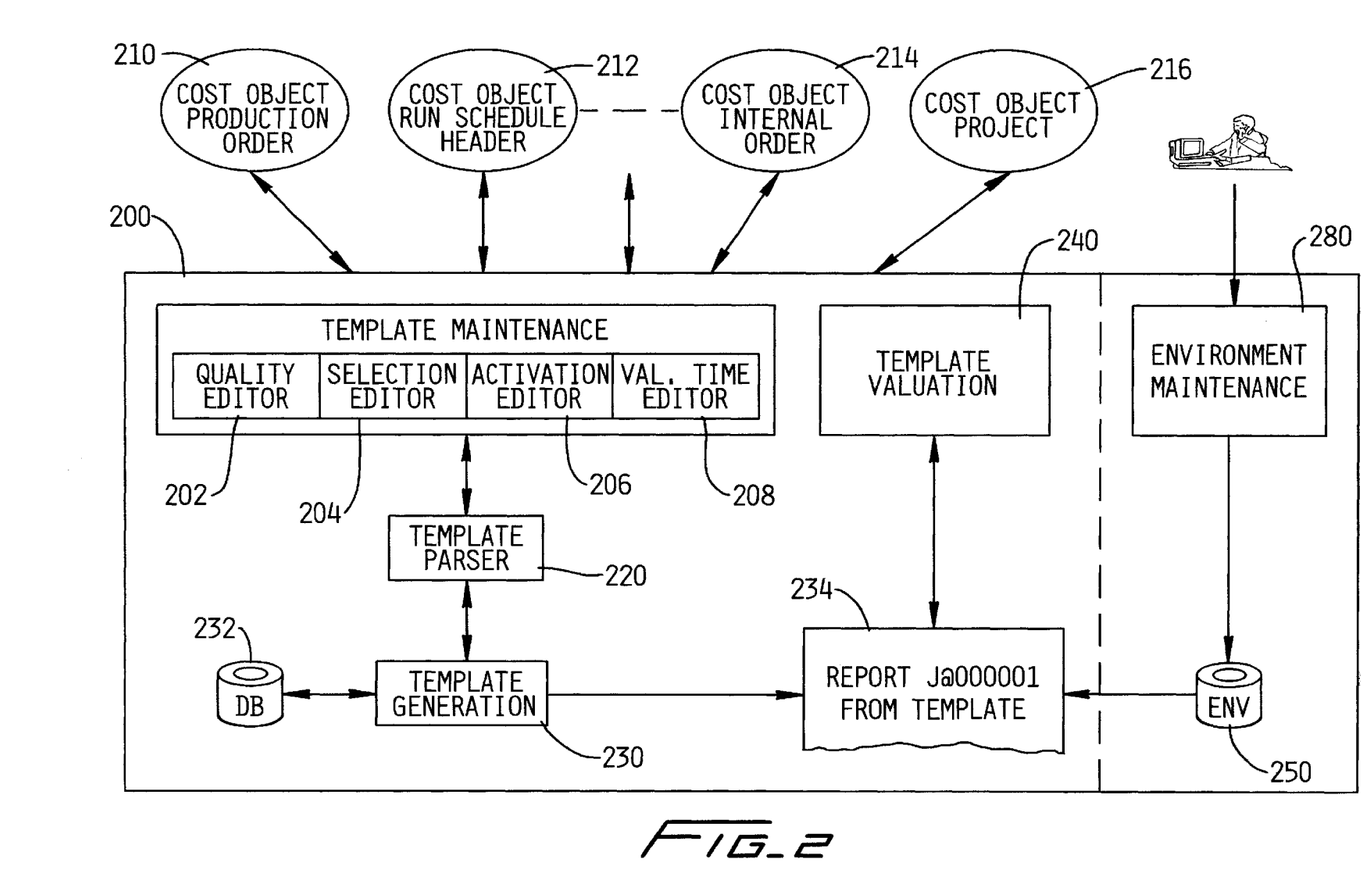
FIG. 2 is a diagram illustrating the interaction of template maintenance, template valuation, and function environment maintenance.

With reference to FIG. 2, the interaction of template maintenance 200, template valuation 240, and environment maintenance 280 is shown for a preferred embodiment of the process template. Quantity editor 202, selection editor 204, activation editor 206, and valuation time editor 208 may be used to name and define functions associated with quantity column 114, process selection column 112, activation column 116, and valuation time column 118, respectively. Such functions are associated with a cost object, such as cost object production order 210, cost object run schedule header 212, cost object internal order 214, or cost object project 216.

Template parser 220 checks the syntax of the functions and creates control blocks that are internal representations of the functions. Template generator 230 generates executable report 234 utilizing the control blocks created by template parser 220. Furthermore, template generator 230 handles the physical storage of a generated process template in database 232. Template valuation 240 applies the generated report using the latest available data.

Template environment 250 is a set of tables describing the available functions for the cost objects to which generated process templates may be linked. These tables contain information on how and where to search for desired data, but they do not contain data themselves. Template environment 250 provides the tools for obtaining data required by template parser 220 to properly create control blocks, and also to properly create or update executable report 234. Environment maintenance 280 provides the actual data for the tables in template environment 250.

Template Maintenance Interface

The maintenance interface is a user interface that allows the user to enter language-dependent function names and descriptions. This user interface provides several specific editors for flexible maintenance of the different cells in a process template. Referring again to FIG. 1 and the embodiment of the invention illustrated therein, the cells of selection column 112 may be accessed and maintained by selection editor 204. Similarly, the cells of quantity column 114 may be accessed and maintained by quantity editor 202, the cells of activation column 116 may be accessed and maintained by activation editor 206, and the cells of valuation time column 118 may be accessed and maintained by valuation time editor 208. These editors have the same internal structures and interfaces to the core module of the process template illustrated by process template overview 100, but present the different types of cell contents appropriately for the user. For example, editors 204 and 206 associated with the cells of selection column 112 and activation column 116 are designed to support the maintenance of Boolean expressions. Editors 202 and 208 associated with the cells of quantity column 114 and valuation time column 118 are designed to support the maintenance of more complicated mathematical formulas.

Figure 3:
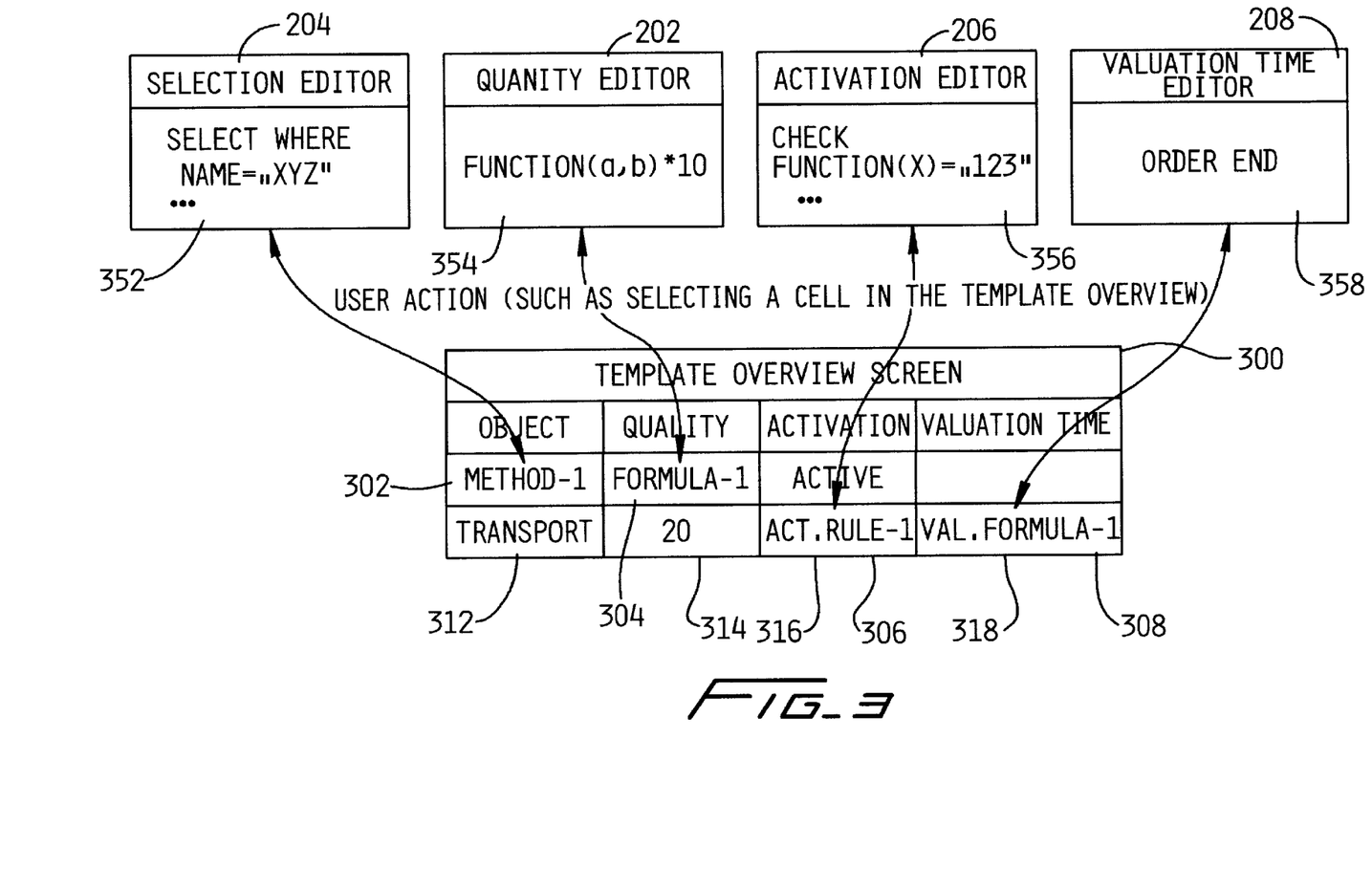
FIG. 3 is a diagram illustrating interaction of a user interface with specialized editors.

With reference to FIG. 3, a more detailed example of a user interface interacting with specialized editors is shown. The process template represented by process template overview 300 has selection column 312, quantity column 314, activation column 316, and valuation time column 318.

Selection functions, such as selection method 352 associated with cell 302 may be named, defined, and edited by selection editor 204. Similarly, quantity functions, such as quantity formula 354 associated with cell 304 may be named, defined, and edited by quantity editor 202, while activation functions, such as activation method 356 associated with cell 306 may be named, defined, and edited by activation editor 204, and valuation time functions, such as valuation time function 358 associated with cell 308 may be named, defined, and edited by valuation time editor 208. Thus, users can define their own functions that are associated with specific cells without affecting other parts of the process template. Realization is supported by existing functions, or new functions may be created with system development tools, such as standard database management tools.

Figure 4:
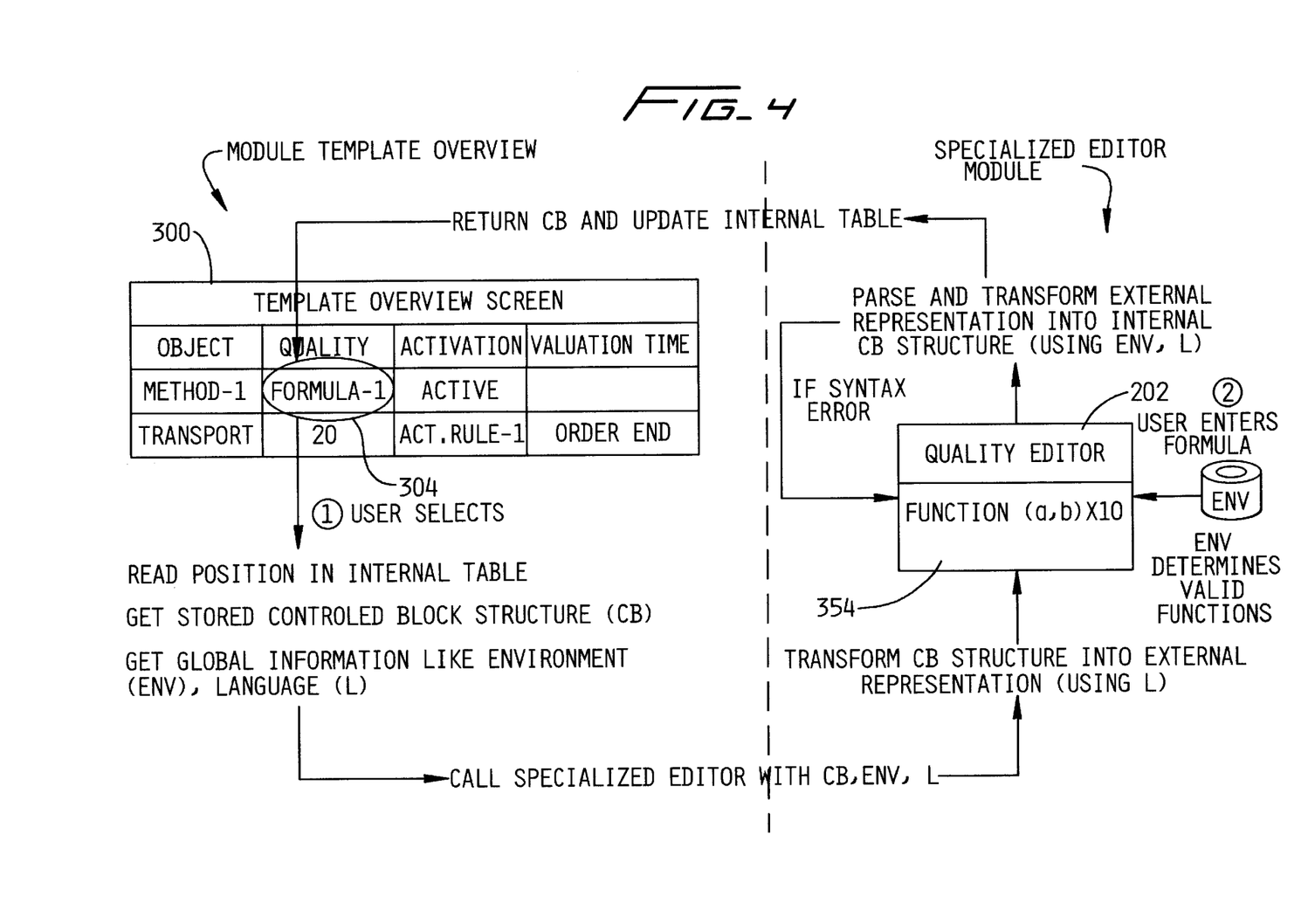
FIG. 4 is a diagram illustrating communication between a specialized editor module and a process template.

Referring to FIG. 3 and FIG. 4, suppose, for example, a user selects cell 304, which is in quantity column 314. Based on the selection of cell 304, the appropriate control blocks of an internal table representing the process template represented by process template overview 300 are read and passed to quantity editor 202. Global data related to the process template, such as data identifying the type of cost object for which the process template is designed, is also provided to quantity editor 202. If cell 304 already contains a function, the control blocks associated with the function are transformed back into the language-dependent external representation for editing. Once a function is entered or changed by quantity editor 202, the formula string is checked syntactically and transformed into the control block structure by template parser 220 (shown in FIG. 2).

Environment Maintenance

As stated above, environment maintenance 280 provides the data required by template parser 220, utilizing the tables of template environment 250.

For example, suppose a function for cost object production order 210 requires information from the bill of material. Template environment 250 describes the internal name of the function, the external name of the function, the necessary parameters, the type of results, and other types of information that may be needed. This information is used in the creation of control blocks by template parser 220.

The tables of template environment 250 also control the availability of a particular function for a particular column in a given context. For example, a definition stored in a table may provide that the function for cost object production order 210 requiring information from the bill of material applies only to those cost objects referring to materials.

Parsing Functions and Creating Control Blocks

Figure 5:
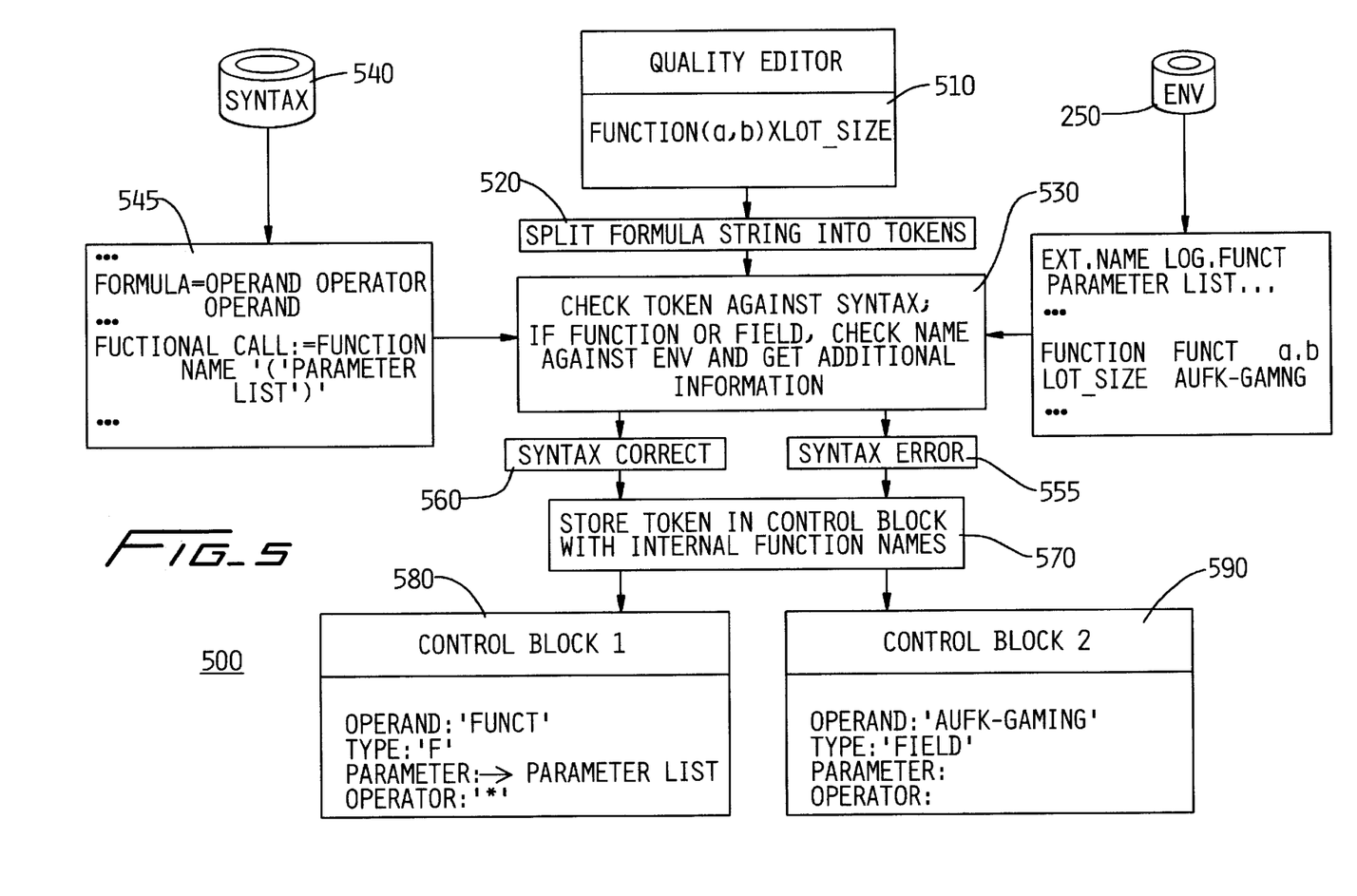
FIG. 5 is a diagram showing an application of a parser.

As noted above, template parser 220 checks the syntax of functions and creates control blocks. The following example illustrates the operation of template parser 220.

With reference to FIG. 5, formula 510, which is from cell 104, is to be parsed. Template parser 220 first performs a split 520 of formula 510 into tokens. Check 530 compares the tokens against grammar description 545, taken from syntax database 540. Check 530 also compares the tokens against the tables of template environment 250 that describe the available functions for the current cost object. If the syntax is incorrect or if the function is not available for the current cost object, template parser 220 returns an error condition 555. On the other hand, if correct syntax determination 560 occurs, then storage 570 of the token in control blocks with internal function names occurs. In the example, a chain of control blocks (control blocks 580 and 590) are created. Control blocks 580 and 590 are internal representations of formula 510, and contain internal descriptions of the external (language-specific) function name and parameters of formula 510.

Generation of a Template Report

Figure 6:
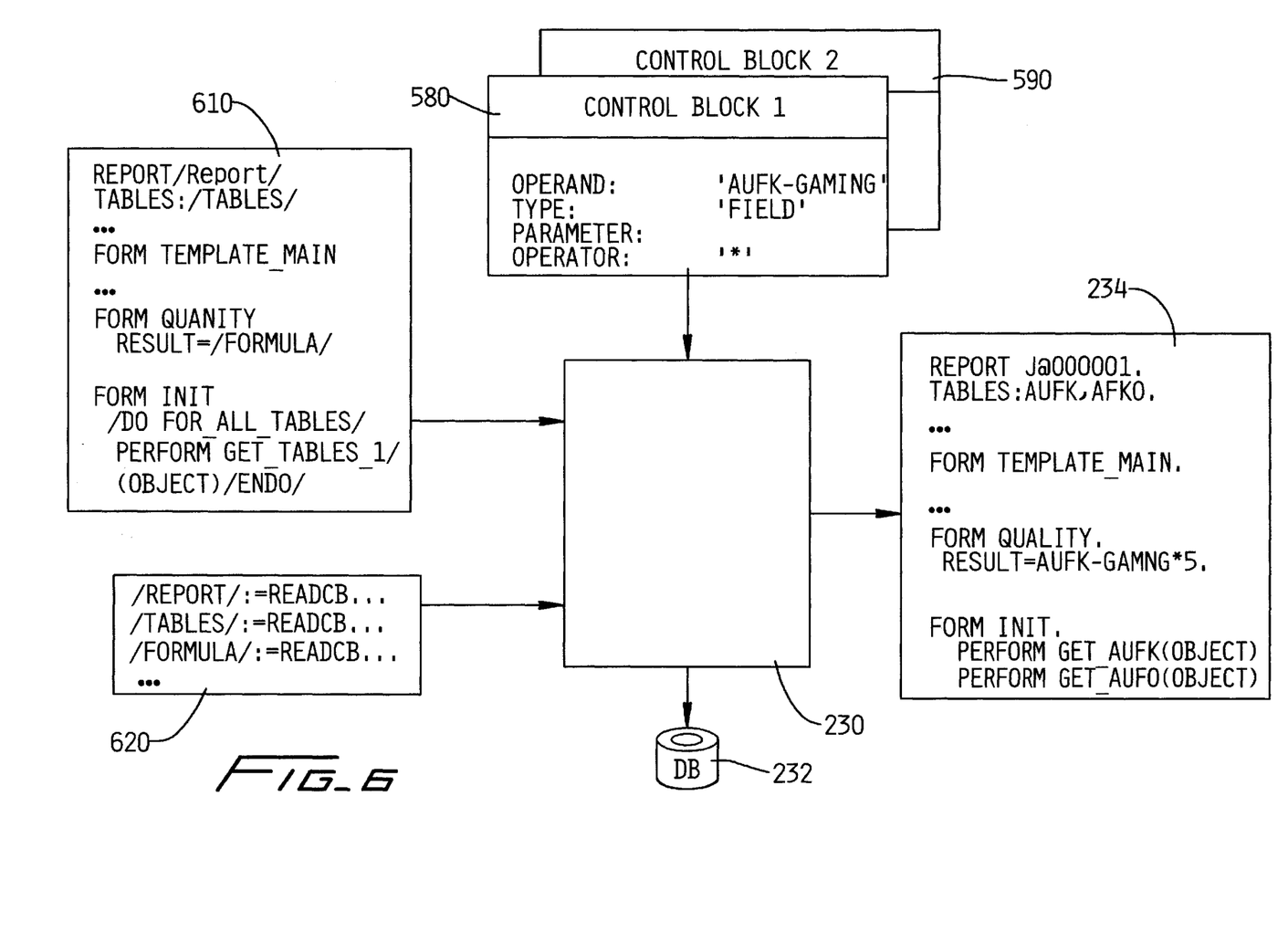
FIG. 6 is a diagram showing an application of a template generator.

As described above, template generator 230 handles the physical storage of process templates and the generation of executable reports, which are runtime objects.

Referring to FIG. 6, control blocks 580 and 590 are processed by template generator 230. The structure of control blocks 580 and 590 are transformed into relational database tables in database 232 by template generator 230. The generation of executable report 234 utilizes predefined report generation frame 610 to define variables that are replaced by the appropriate values from control blocks 580 and 590, based on library 620, which contains rules for providing data for each variable. These variables and rules are generic, and therefore can be used for templates associated with any cost object.

Template Valuation

Figure 7:
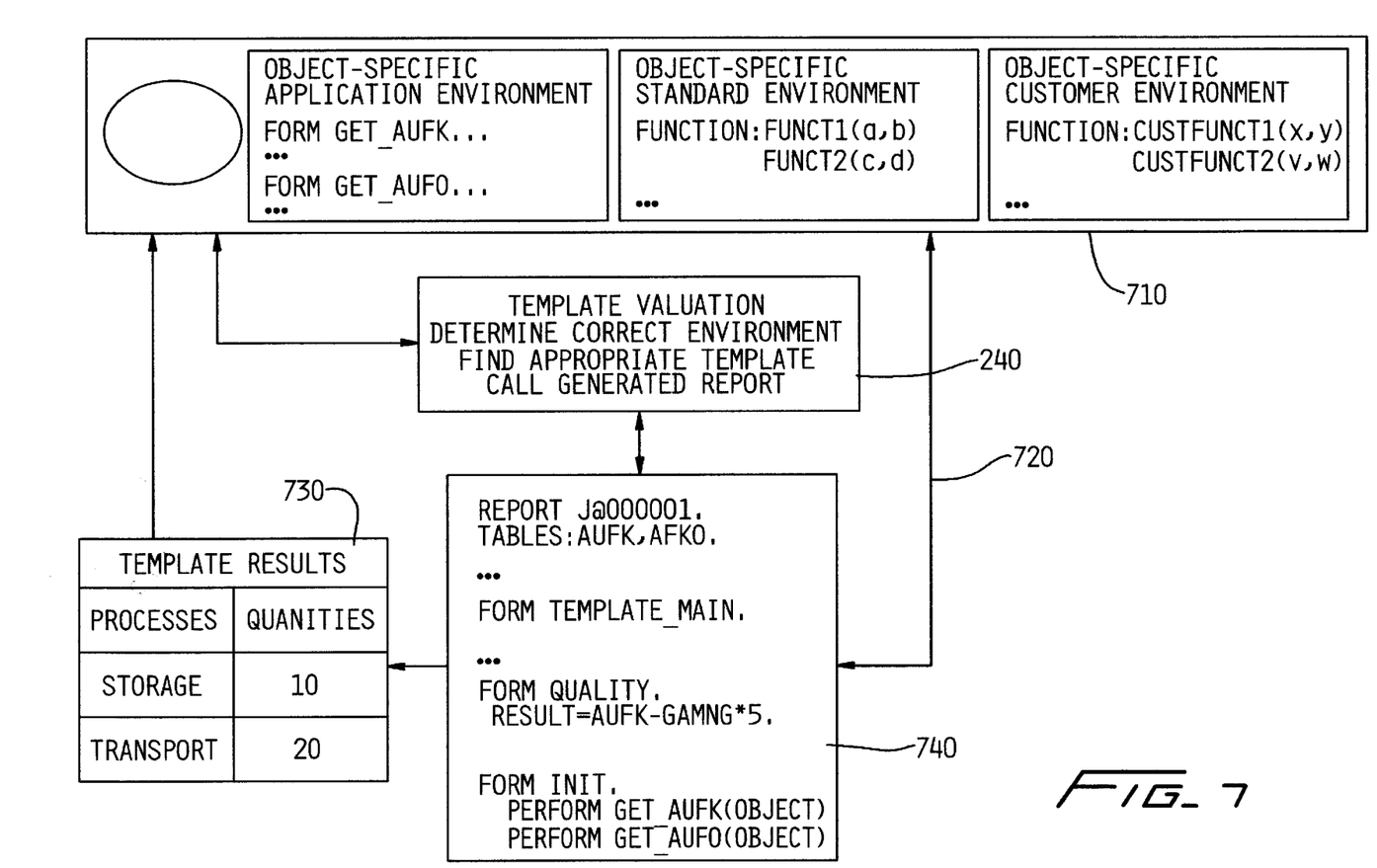
FIG. 7 is a diagram showing a template valuation.

Template valuation 240 applies generated executable report 234 to the latest available data. Referring to FIG. 7, template valuation 240 is triggered by an application, such as costing run for a production order 710, that is cost object-specific. Template valuation 240 may occur any number of times, and a process template may be used repeatedly by a multitude of cost objects, since the process template definition is not exclusively linked to a single cost object.

In a preferred embodiment of the invention, a general valuation module may be used to control the execution of executable report 234. Such a module collects the calculated results of executable report 234, and transfers the results to the calling operation. During template valuation 240, dynamic application link 720 may be used to obtain information directly from the calling application and/or from other parts of the system. The results 730 and report 740 of template valuation 240 are specific to dynamic application link 720, and the calling application itself is responsible for processing (or reprocessing) the calculated results.

Other Embodiments

While there have been shown and described and pointed out fundamental novel features of the invention as applied to embodiments thereof, it will be understood that various omissions and substitutions and changes in the form and details of the invention, as herein disclosed, may be made by those skilled in the art without departing from the spirit of the invention. By way of example only, the present invention may be used in conjunction with various costing techniques. It is expressly intended that all combinations of those elements and/or method steps which perform substantially the same function in substantially the same way to achieve the same results are within the scope of the invention. It is the intention, therefore, to be limited only as indicated by the scope of the claims appended hereto.

What is claimed is:

1. A template used in a computerized system to allocate costs, said template comprising:
   a construct stored in said computerized system,
   said construct having a set of functions each identifying at least one of a plurality of sender objects that provide resources or defining a relationship between one or more sender objects and a receiver object that consumes resources;
   said construct being configured so that a valuation thereof can be triggered by a costing application, and, in said valuation, said functions are applied using the latest available data at the time of valuation;
   said construct being defined by a system comprising
      an interface adapted to be used by a user, said interface accepting from said user language-dependent names and descriptions of said functions, said language-dependent names and descriptions of said functions being in one of a plurality of languages;
      a parser parsing said language-dependent names and descriptions of said functions and creating control blocks as internal descriptions of said functions; and
      a generator generating an executable report dependent on said control blocks.

2. The template of claim 1, wherein said interface utilizes a plurality of editor modules to edit said names and descriptions of said functions.

3. The template of claim 2, wherein said plurality of editor modules is linked to a core module.

4. The template of claim 1, wherein said interface displays a plurality of tables, each one of said plurality of tables comprising a plurality of cells.

5. The template of claim 4, wherein each one of said plurality of tables is associated with said function names and function descriptions.

6. The template of claim 1, wherein said parser separates each one of said language-dependent functions into tokens that are matched with grammar for allowed syntax.

7. The template of claim 1, wherein said generator also handles physical storage of said process template.

8. A computer-implemented method for allocation of costs among a plurality of sender objects that provide resources and a receiver object that consumes said resources, said method comprising:
   defining a template having at least one a function that identifies one of the sender objects or defines a relationship between the receiver object and one or more of the sender objects; and
   performing a valuation of the template with the function applying the most current data available at the time of evaluation, said defining step including
      receiving from an interface adapted to be used by a user language-dependent names and parameters of said functions, said language-dependent names and descriptions of said functions being in one of a plurality of languages;
      parsing said language-dependent names and descriptions of said functions to create control blocks as internal descriptions of the functions; and
      generating an executable report dependent on said control blocks.

9. The computer-implemented method for allocation of costs of claim 8, further comprising the step of providing a plurality of editors for editing said language-dependent names and descriptions of said functions.

10. The computer-implemented method for allocation of costs of claim 9, wherein said plurality of editors are linked to a core module.

11. The computer-implemented method for allocation of costs of claim 8, further comprising the step of displaying a plurality of tables, each one of said plurality of tables comprising a plurality of cells containing representations of said language-dependent names and descriptions of said functions.

12. The computer-implemented method for allocation of costs of claim 11, wherein each one of said plurality of tables is associated with said function names and function descriptions.

13. The computer-implemented method for allocation of costs of claim 8, wherein said parsing includes separating each one of said language-dependent names and descriptions of said functions into tokens that are matched with grammar for allowed syntax.

14. The computer-implemented method for allocation of costs of claim 8, wherein said generating executable reports includes handling physical storage of said process template.

15. An apparatus for allocation of costs, said system comprising:
   a template stored in a computerized system and linked to a plurality of sender objects that provide resources and a receiver object that consumes resources;
   said template having a set of functions each identifying one or more of the sender objects or defining a relationship between one or more of the sender objects and the receiver object;
   said template being configured so that a valuation thereof can be triggered by a costing application, and, in said valuation, said functions are applied using data required thereby that is the latest available data at the time of valuation and
   a system for defining or editing the template, said system having interface means for accepting from a user language-dependent names and descriptions of said functions, said language-dependent names and descriptions of said functions being in one of a plurality of languages and describing said relationships between the sender objects and the receiver objects in the construct;

parser means for creating control blocks as internal descriptions of said language-dependent functions; and generator means for generating an executable report dependent on said control blocks.

16. The apparatus for allocation of costs of claim 15, wherein said interface means provides a plurality of editor means for editing said language-dependent names and descriptions of said functions.

17. The apparatus for allocation of costs of claim 16, wherein said plurality of editor means is linked to a core module.

18. The apparatus for allocation of costs of claim 15, wherein said interface means includes display means for displaying a plurality of tables, each one of said plurality of tables comprising a plurality of cells.

19. The apparatus for allocation of costs of claim 18, wherein each one of said plurality of tables is associated with said function names and function descriptions.

20. The apparatus for allocation of costs of claim 15, wherein said parser means separates each one of said language-dependent names and descriptions of said functions into tokens that are matched with grammar for allowed syntax.

21. The apparatus for allocation of costs of claim 15, wherein said generator means includes means for handling physical storage of said template.

22. A computer-implemented method for allocation of costs which can be used with different cost receiving objects, said method comprising the steps of:

defining a template having a plurality of functions that identify sender objects that provide resources or that define relationships between one or more sender objects that provide resources and a receiver object that consumes said resources and performing a valuation of said template wherein said template is linked to a specific receiver object and said functions are applied using data required thereby that is the most current data at the time of valuation, said defining step including inputting language-dependent names and descriptions of said functions using an R/3 user interface, said language-dependent names and descriptions of said functions being in one of a plurality of languages, and defining said relationships between the sender objects and the receiver object in the template;

parsing said language-dependent names and descriptions of said functions to create control blocks as internal descriptions of said functions; and generating executable reports dependent on said control blocks.

23. The computer-implemented method for allocation of costs of claim 22, further comprising the step of providing a plurality of editors for editing said language-dependent names and descriptions of said functions.

24. The computer-implemented method for allocation of costs of claim 23, wherein said plurality of editors are linked to a core module.

25. The computer-implemented method for quantity-based allocation of costs of claim 22, further comprising the step of displaying a plurality of tables, each one of said plurality of tables comprising a plurality of cells containing representations of said names of said language-dependent functions.

26. The computer-implemented method for allocation of costs of claim 25, wherein each one of said plurality of tables is associated with said function names and function descriptions.

27. The computer-implemented method for allocation of costs of claim 22, wherein said parsing includes separating each one of said language-dependent names and descriptions of said functions into tokens that are matched with grammar for allowed syntax.

28. The computer-implemented method for allocation of costs of claim 22, wherein said generating of the executable report includes handling physical storage of said template.

* * * * *